United States Patent
Knittel

(10) Patent No.: US 8,179,746 B2
(45) Date of Patent: May 15, 2012

(54) NEAR-FIELD OPTICAL RECORDING APPARATUS, METHOD AND MEDIUM

(75) Inventor: Joachim Knittel, Tuttlingen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/807,780

(22) Filed: Sep. 14, 2010

(65) Prior Publication Data

US 2011/0063954 A1    Mar. 17, 2011

(30) Foreign Application Priority Data

Sep. 15, 2009    (EP) ..................................... 09305846

(51) Int. Cl.
*G11B 11/00* (2006.01)
*G11B 7/00* (2006.01)

(52) U.S. Cl. ................................ 369/13.33; 369/112.24

(58) Field of Classification Search ............... 369/13.33, 369/44.23, 44.29, 44.35, 44.41, 112.23, 112.24, 369/44.26
See application file for complete search history.

(56) References Cited

U.S. PATENT DOCUMENTS

| | | | |
|---|---|---|---|
| 5,946,282 A | 8/1999 | Hirono et al. | |
| 2002/0054561 A1 | 5/2002 | Inase et al. | |
| 2005/0190666 A1 | 9/2005 | Ishimoto | |
| 2006/0187773 A1 * | 8/2006 | Ishimoto | 369/44.25 |
| 2008/0089210 A1 | 4/2008 | Saito et al. | |
| 2009/0059741 A1 * | 3/2009 | Ishimoto | 369/44.11 |
| 2009/0067302 A1 | 3/2009 | Ishimoto | |
| 2009/0168633 A1 | 7/2009 | Ishimoto | |
| 2009/0180372 A1 * | 7/2009 | Jeong et al. | 369/112.23 |
| 2009/0185306 A1 * | 7/2009 | Park et al. | 360/75 |
| 2009/0190453 A1 * | 7/2009 | Lee et al. | 369/53.19 |
| 2009/0290456 A1 * | 11/2009 | Futakuchi et al. | 369/44.23 |

FOREIGN PATENT DOCUMENTS

| JP | 2000206411 | | 7/2000 |
|---|---|---|---|
| JP | 2002319153 A | * | 10/2002 |

OTHER PUBLICATIONS

International Search report dated Apr. 28, 2010.

* cited by examiner

*Primary Examiner* — Thang Tran
(74) *Attorney, Agent, or Firm* — Myers Wolin, LLC

(57) ABSTRACT

An apparatus, a method and a recording medium for optical near-field recording are proposed. The apparatus includes a light source for generating a reading light beam, which is illuminated onto a near-field optical recording medium. The apparatus further includes a detector for generating a gap error signal from a light beam returning from the near-field optical recording medium. A data signal is derived from an output signal of the detector by a signal processor.

6 Claims, 5 Drawing Sheets

NEAR-FIELD OPTICAL RECORDING APPARATUS, METHOD AND MEDIUM

CROSS REFERENCE

This application claims the benefit, under 35 U.S.C. §119 of European Patent Application 09305846.9, filed Sep. 15, 2009.

FIELD OF THE INVENTION

The present invention relates to a method and an apparatus for optical near-field recording. The invention further relates to a near-field optical recording medium suitable for the near-field optical recording method and apparatus.

BACKGROUND OF THE INVENTION

Optical data storage is generally limited by the optical resolution of the read/write-system. Straightforward methods of increasing the optical resolution include using a shorter wavelength and a larger numerical aperture NA, at the costs of lens complexity. Further approaches are narrowing the allowable tilt margins for the optical storage media or reducing the wavelength of the scanning laser into the blue or near-UV range. A different approach for reducing the focus spot size in an optical data storage system is using near-field optics with a high numerical aperture (NA>1). This high numerical aperture is generally achieved by help of a solid immersion lens (SIL). While conventional systems like CD, DVD or BD operate in the optical far-field regime, which is described by classical optics, the aforementioned new systems work in the optical near-field regime, which is described by near-field optics. For conventional systems the working distance, i.e. the air gap between the surface of the optical storage medium and the first optical surface of the read/write-head, usually the objective lens, is in the scale of 100 µm. In contrast, systems making use of near-field optics need a very small working distance or air gap, which is in the scale of 50 nm or less. The small air gap is necessary to ensure that evanescent waves may couple into optical storage medium. To control the distance between the read/write-head and the optical storage medium a so-called gap error signal (GES) is generated. This control method makes use of the fact that the amount of reflected light due to total internal reflection in the solid immersion lens is proportional to the size of the air gap at least in the size range used for near-field storage. An optical storage system making use of near-field optics and the gap error signal is disclosed in US 2009/0168633. Similar systems are disclosed in F. Zijp et al.: "*High-Density Near-Field Optical Recording With a Solid Immersion Lens, Conventional Actuator, and a Robust Air Gap Servo*", IEEE Trans. Mag. Vol. 41 (2005), pp. 1042-1046, and C. A. Verschuren et al.: "*Near-Field Recording with a Solid Immersion Lens on Polymer Cover-layer Protected Discs*", Jap. J. Appl. Phys. Vol. 45 (2006), pp. 1325-1331.

SUMMARY OF THE INVENTION

It is an object of the invention to propose a simplified solution for reading from a near-field optical recording medium, as well as an optical recording medium adapted to this simplified solution.

According to a first aspect of the invention, an apparatus for reading from a near-field optical recording medium has a light source for generating a reading light beam and a detector for generating a gap error signal from a light beam returning from the near-field optical recording medium. The apparatus includes a signal processor for deriving a data signal from an output signal of the detector.

Similarly, according to a further aspect of the invention, a method for reading from a near-field optical recording medium has the steps of:
generating a reading light beam,
illuminating the near-field optical recording medium with the reading light beam;
detecting a gap error signal from a light beam returning from the near-field optical recording medium with a detector; and
deriving a data signal from an output signal of the detector.

The invention proposes to use the gap error signal, which is generated in any case for focus control, to detect the pits on the near-field optical recording medium, i.e. to derive a data signal. The amount of light that is totally reflected at the bottom of a solid immersion lens used for illuminating the near-field optical recording medium with the reading light beam depends on the distance between this lens and the surface of the near-field optical recording medium. If the pits are close to the solid immersion lens, a part of the light that would otherwise be totally reflected is coupled into the pit and continues to propagate into the near-field optical recording medium. Consequently, a part of the energy is lost. The sequence of pits and lands (gaps) thus results in a HF modulation of the gap error signal, which corresponds to the data signal. This HF modulation is derived from the output signal of the detector with a signal processor. Only a small modification of the apparatus is necessary for this purpose. At the same time, a dedicated optical path for obtaining the data signal can be omitted.

Preferably, the signal processor is a high-pass filter. As the data signal is a high-frequency modulation of the gap error signal, it can easily be derived from the gap error signal by a high-pass filter. An additional low-pass filter is advantageously provided for deriving the gap error signal from the output signal of the detector. This allows to use the gap error signal for focus control.

Favorably, the reading light beam is an annular light beam. The modulation caused by the pits does primarily affect the fraction of the reading light beam that is totally reflected at the bottom of the solid immersion lens. This reflected fraction forms an annular cone. Therefore, an annular shaped reading light beam further improves the signal modulation. In addition, annular beams allow to generate a smaller focal spot than full beams, which enables to further increase the data capacity. The generation of annular or doughnut-shaped light beams is described, for example, in H. Kawauchi et al.: "*Simultaneous generation of helical beams with linear and radial polarization by use of a segmented half-wave plate*", Opt. Lett. Vol. 33 (2008), pp. 399-401, and S. Quabis et al.: "*Generation of a radially polarized doughnut mode of high quality*", Appl. Phys. B Vol. 81 (2005), pp. 597-600.

Preferably, an inner radius $r_i$ of the reading light beam is $r_i = f/n_{sil}$ and an outer radius $r_o$ of the reading light beam is $r_o = f*NA$, where f is the focal length of a reading lens system having an objective lens and a solid immersion lens, NA is the numerical aperture of the reading lens system, and $n_{sil}$ is the refractive index of the solid immersion lens. If these conditions are fulfilled, the modulation due to the evanescent coupling of the pits and the near-field is maximized.

According to still a further aspect of the invention, a near-field optical recording medium with pits is provided, which are formed by elevations or depressions of the surface of the optical recording medium. Favorably the pits have a height or a depth between 10 nm and 30 nm. As the pits are arranged at the surface of the optical recording medium, they lead to a modulation of the gap error signal. The proposed height or depth is sufficient to generate a reliably detectable modulation of the gap error signal. At the same time the small height or depth simplifies the manufacturing of the near-field optical recording medium.

Advantageously, the pits have a particularly large width, preferably larger than $0.5\lambda/NA$, where $\lambda$ is a wavelength used for readout and NA is a numerical aperture used for readout. For example, for a reading wavelength of 405 nm and a numerical aperture of 1.5 the width of the pits is larger than 270 nm. In this way the pits cover a large portion of the reading light spot, which improves the coupling of the evanescent waves into the pit. In addition, the particularly wide pits further facilitate manufacturing of the near-field optical recording medium.

Favorably, the near-field optical recording medium does not have a reflective coating. The detection mechanism based on coupling of evanescent waves allows to use a near-field optical recording medium without any reflective coating. A simple molded plastic substrate is sufficient. Apparently this reduces the number of manufacturing steps for the near-field optical recording medium, and hence the manufacturing cost.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
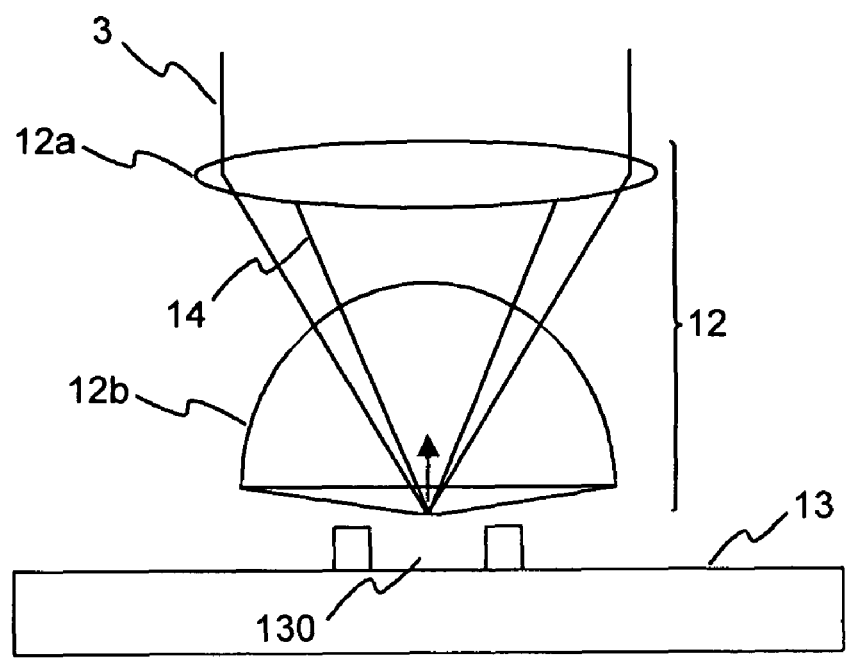
FIG. 1 shows a solid immersion lens located above a gap of a near-field optical recording medium.

FIG. 1 shows a solid immersion lens 12b located above a gap 130 of a near-field optical recording medium 13. The solid immersion lens 12b and an objective lens 12a form a reading system 12, which directs a reading light beam 3 onto the surface of the near-field optical recording medium 13. A fraction 14 of the reading light beam 3 is totally reflected at the bottom of the solid immersion lens 12b. This fraction 14 is depicted by an annular cone. The amount of total reflection depends on the distance between the solid immersion lens 12b and the surface of the optical recording medium 13.

Figure 2:
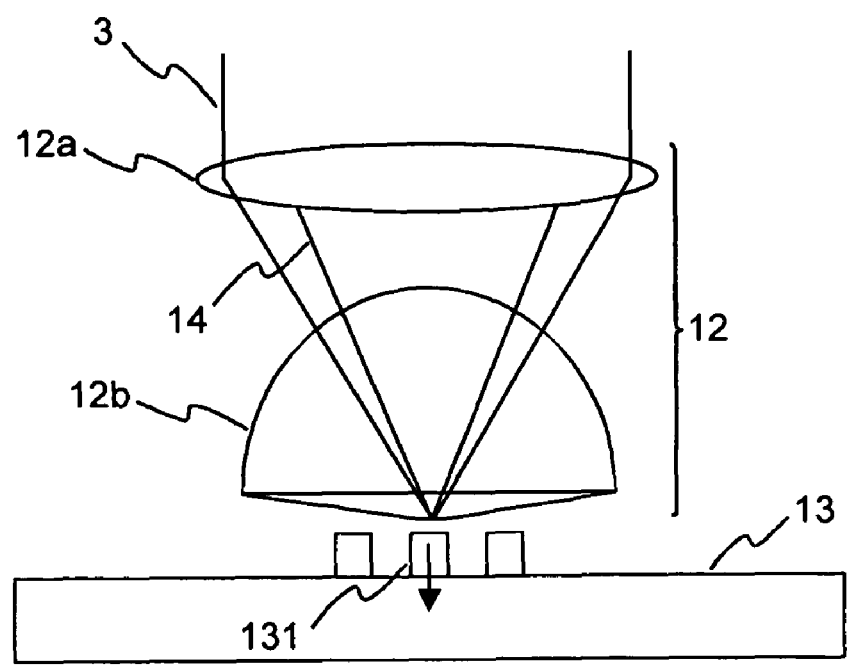
FIG. 2 depicts the solid immersion lens located above a pit of the near-field optical recording medium.

FIG. 2 depicts the solid immersion lens 12b located above a pit 131 of the near-field optical recording medium 13. If the pit 131 is sufficiently close to the solid immersion lens 12b, a part of the energy of the reading light beam 3 that is totally reflected at the bottom of the solid immersion lens 12b is coupled into the pit 131 and continues to propagate into the near-field optical recording medium 13. The amount of reflection is thus reduced.

Figure 3:
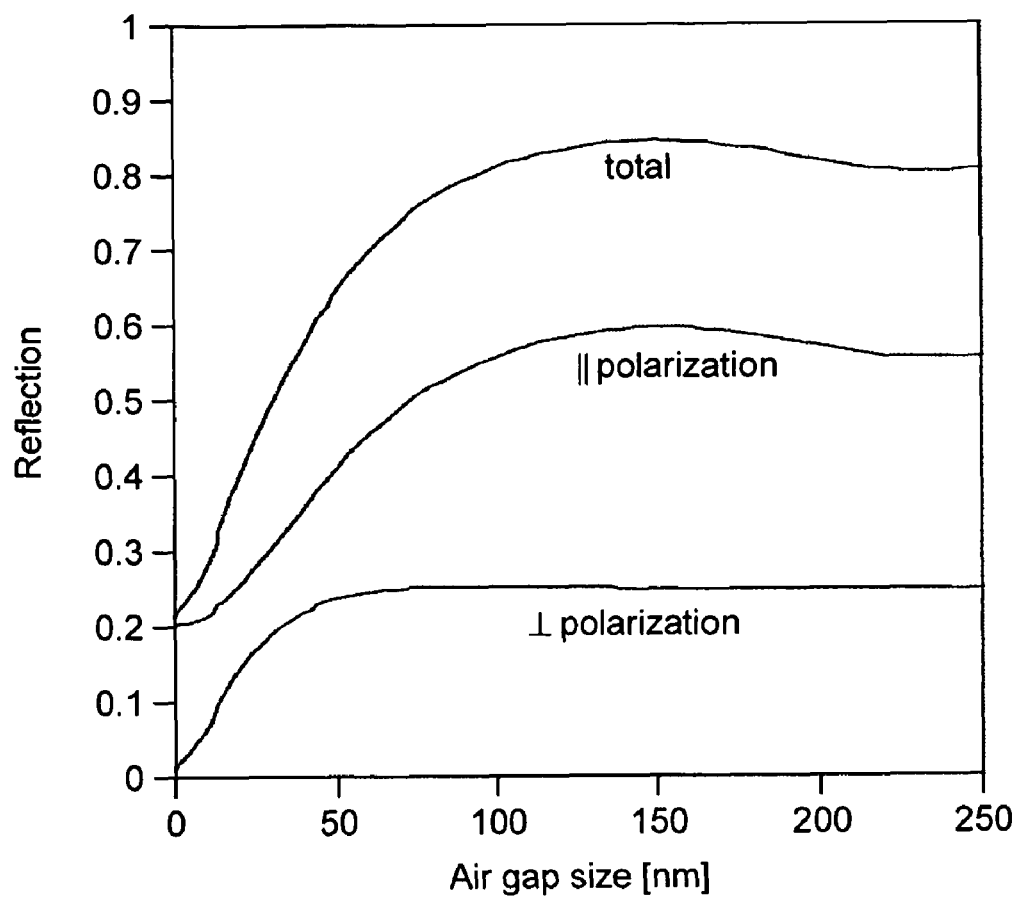
FIG. 3 shows the dependency of the gap error signal on the gap size.
Figure 4:
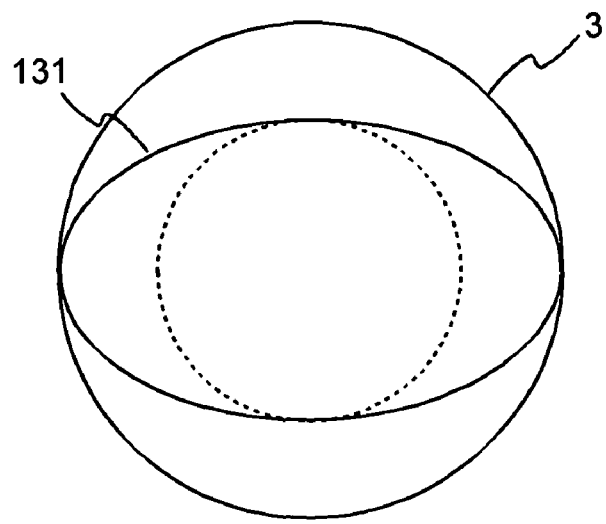
FIG. 4 illustrates the diameter of a focused reading light beam relative to a pit.
Figure 5:
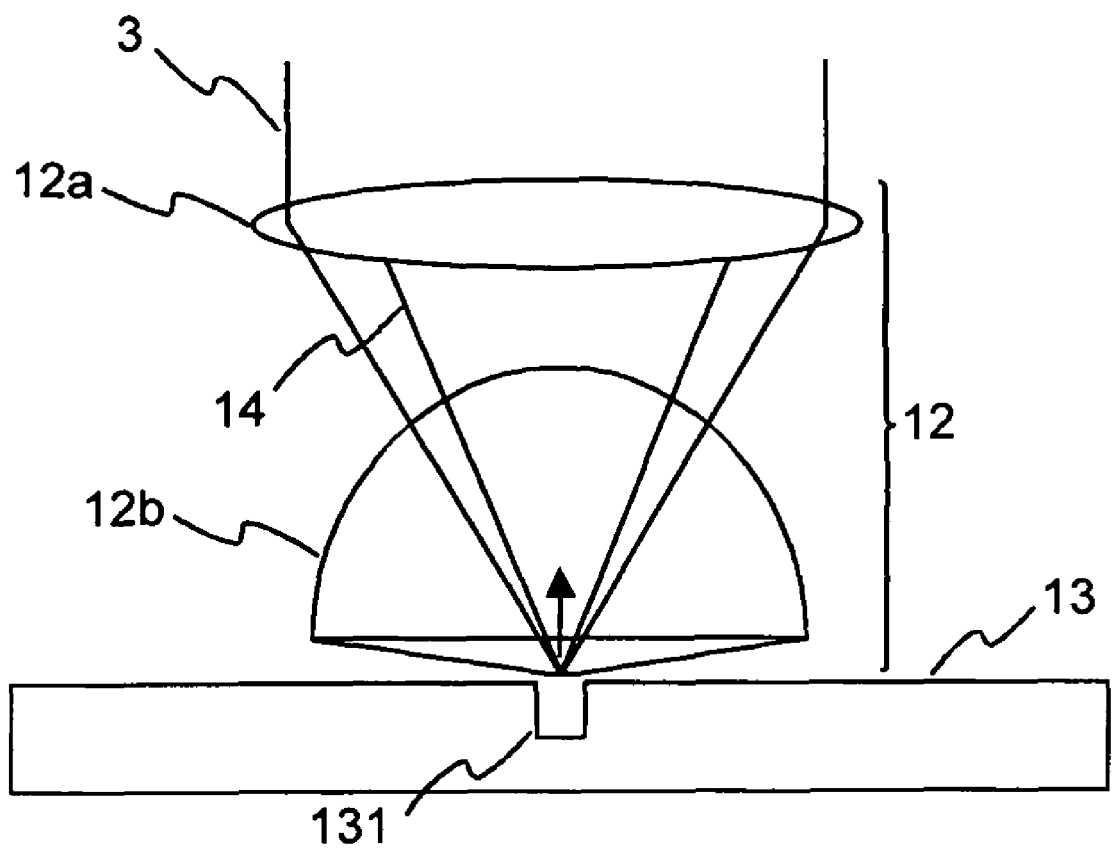
FIG. 5 depicts the solid immersion lens located above a pit formed as a depression in the near-field optical recording medium.

A typical dependency of the gap error signal GES on the gap size as determined by F. Zijp et al. in "*High-Density Near-Field Optical Recording With a Solid Immersion Lens, Conventional Actuator, and a Robust Air Gap Servo*", IEEE Trans. Mag. Vol. 41 (2005), pp. 1042-1046, is depicted in FIG. 3. As can be seen, the gap error signal exhibits a very strong dependency on the distance to the surface of the near-field optical recording medium 13. According to the present invention this dependency is used for deriving a data signal HF from the gap error signal GES. For this purpose an optical recording medium 13 is proposed, which consists of a plastic substrate with molded pits 131. No reflective coating is necessary. However, a special hard-coating is preferably applied to increase the robustness of the optical recording medium 13. A pit height of 10 nm to 30 nm is sufficient to generate a sufficiently strong modulation of the gap error signal. The pit width is advantageously larger than the pit width of a conventional ROM optical recording medium. In a standard ROM optical recording medium the destructive interference between the light reflected from pit and land is used for detection. Here the mechanism is different. The strong distance dependency of the coupling of the evanescent waves with the optical recording medium is used to decrease the reflected signal. Therefore, the pits should be as wide as possible to cover the complete light spot. In conventional ROM optical recording media the pit width is typically smaller than $0.4*\lambda/NA$, where $\lambda$ is the wavelength of the reading light beam and NA is the numerical aperture of the objective lens. For the proposed optical recording medium the pits are preferably wider than $0.5*\lambda/NA$. This is schematically depicted in FIG. 4, where the outer circle represents the diffraction limited focus of the reading light beam 3 with a diameter of $0.66*\lambda/NA$, the middle circle represents a pit 131 with a width of $0.66*\lambda/NA$ and a length of $0.4*\lambda/NA$, and the inner (dashed) circle represents a conventional pit with a width of $0.4*\lambda/NA$. For tracking the known push-pull signal is advantageously used. Of course, if the pits are pressed into the material, i.e. if the pits are depressions, the modulation of the data signal is inversed. In this case the gap error signal is large when the solid immersion lens is located above a pit. This is schematically depicted in FIG. 4.

Figure 6:
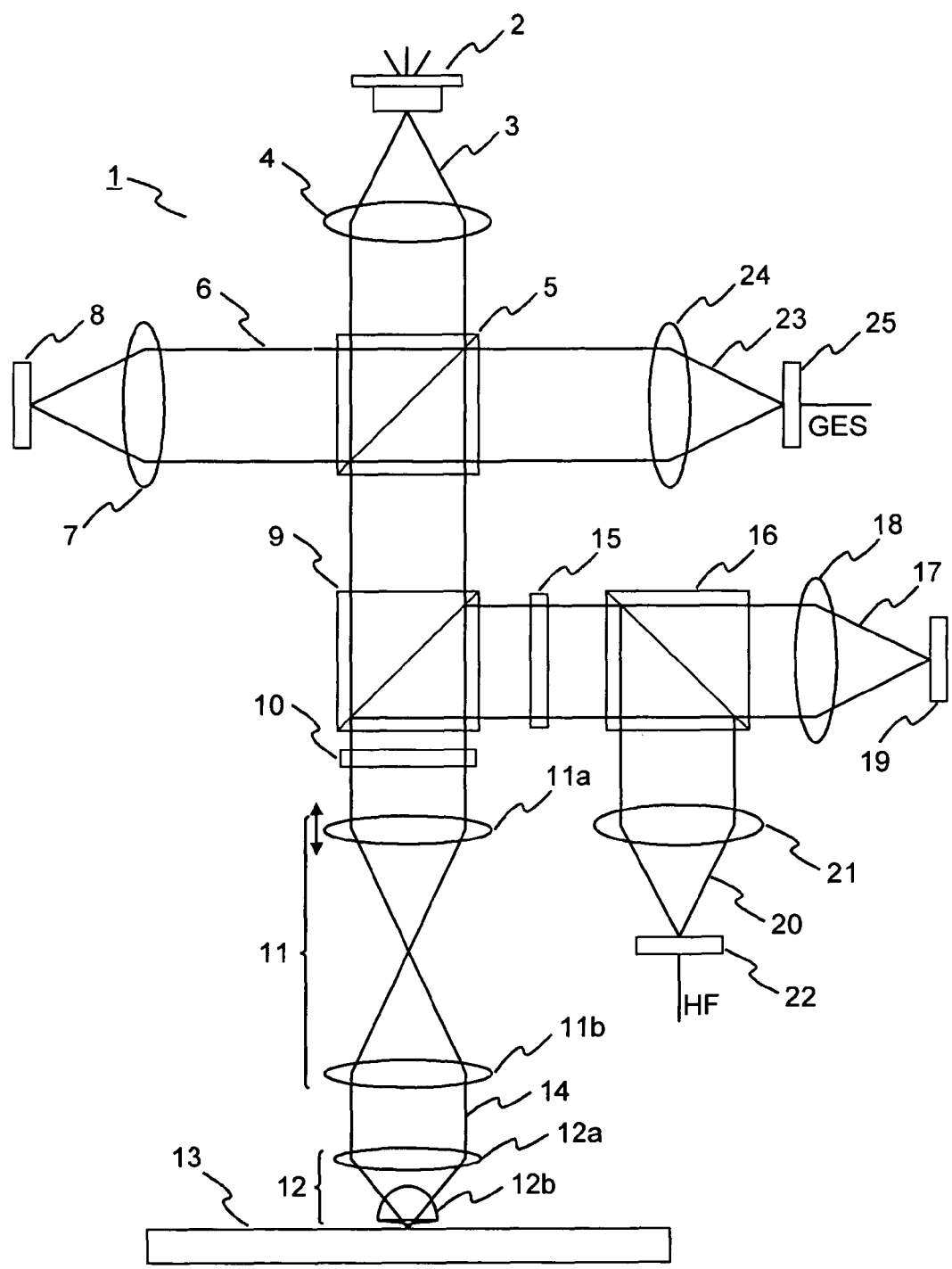
FIG. 6 illustrates a known apparatus for reading from a near-field optical recording medium.

An apparatus 1 for reading from a near-field optical recording medium is illustrated in FIG. 6. This apparatus is known from C. A. Verschuren et al.: "*Near-Field Recording with a Solid Immersion Lens on Polymer Cover-layer Protected Discs*", Jap. J. Appl. Phys. Vol. 45 (2006), pp. 1325-1331. A reading light beam 3 emitted by a laser diode 2 is collimated by a collimating lens 4. A non-polarizing beam splitter 5 directs a small fraction 6 of the reading light beam 3 via a first objective lens 7 onto a forward detector 8 for measuring the output power of the laser diode 2. The main part of the reading light beam 3 passes a polarizing beam splitter 9 and a quarter wave plate 10, which converts the polarization of the reading light beam 3 into a circular polarization. The reading light beam 3 then passes through a telescope 11 for focus adjustment, which consists of two lenses 11a, 11b. A near-field lens 12 consisting of a second objective lens 12a and a solid immersion lens 12b finally directs the reading light beam 3 onto the surface of an optical recording medium 13. After interaction with the optical recording medium 13 the returning reading light beam 14 passes the quarter wave plate 10, which converts the polarization of the returning reading light beam 14 into a linear polarization. Therefore, most of the returning reading light beam 14 is diverted by the polarizing beam splitter 9 into a detection branch. The detection branch includes a half wave plate 15 and a further polarizing beam splitter 16, which splits the returning reading light beam 14 into a first part 17, which is directed by a third objective lens 18 onto a detector 19 for tracking control, and a second part 20, which is directed by a fourth objective lens 21 onto a detector 22 for data detection. A small fraction 23 of the returning reading light beam 14 passes through the polarizing beam splitter 9, as the total reflection causes a slight rotation of the direction of polarization, and is directed by the non-polarizing beam splitter 5 and a fifth objective lens 24 onto a detector 25 for generating the gap error signal.

Figure 7:
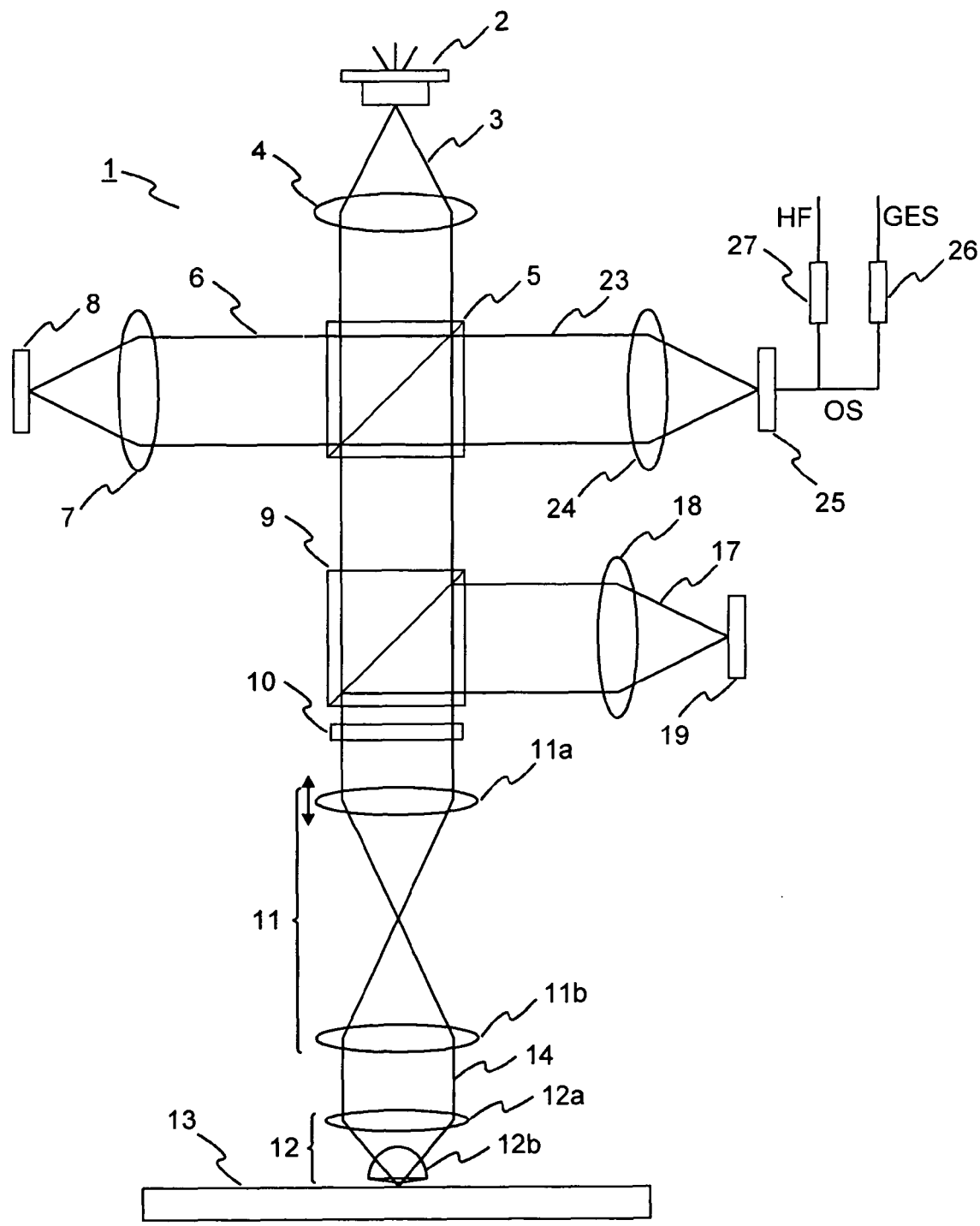
FIG. 7 depicts an apparatus according to the invention for reading from a near-field optical recording medium.

An apparatus 1 according to the invention for reading from a near-field optical recording medium 13 is depicted in FIG. 7. The apparatus 1 is similar to known apparatus, except that the output signal OS of the detector 25 for generating the gap error signal is split into a low-frequency path (e.g. <50 kHz) with a low-pass filter 26 and a high-frequency path (e.g. >1 MHz) with a high-pass filter 27. The high-frequency path is used for detection of the data signal HF, whereas the low-frequency path is used for focus control based on the filtered gap error signal GES. The HF detector 22 of FIG. 4 and the associated optical components 15, 16, 21 for directing a fraction of the returning reading light beam 14 towards this detector 22 are no longer needed for data detection.

As explained before the modulation caused by the pits does primarily affect the fraction of the reading light beam that is totally reflected at the bottom of the solid immersion lens. An annular shaped reading light beam further improves the signal modulation. Preferentially, the inner radius $r_i$ of the reading light beam is $r_i = f/n_{sil}$ and the outer radius $r_o$ of the reading light beam is $r_o = f*NA$, where f is the focal length of the lens system, NA is the numerical aperture of the lens system (including the solid immersion lens) and $n_{sil}$ is the refractive index of the solid immersion lens. If these conditions are fulfilled, the modulation due to the evanescent coupling of the pits and the near-field is maximized. Also, it is known that under certain conditions annular beams have a smaller focal spot than full beams. This fact can be used to further increase the data capacity.

The invention claimed is:

1. An apparatus for reading from a near-field optical recording medium, the apparatus comprising:
    a light source for generating a reading light beam;
    a reading lens system comprising an objective lens and a solid immersion lens for illuminating the near-field optical recording medium with the reading light beam;
    a detector for generating an output signal from a light beam returning from the near-field optical recording medium; and
    a signal processor for deriving a gap error signal and a data signal from the output signal of the detector;
    wherein the reading light beam is an annular light beam wherein an inner radius $r_i$, of the reading light beam is $r_i = f/n_{sil}$ and an outer radius $r_o$ of the reading light beam is $r_o = f*NA$ where f is the focal length of the reading lens system, NA is the numerical aperture of the reading lens system, and $n_{sil}$ is the refractive index of the solid immersion lens.

2. The apparatus according to claim 1, further comprising a high-pass filter for deriving the data signal from the output signal of the detector.

3. The apparatus according to claim 1, further comprising a low-pass filter for deriving the gap error signal from the output signal of the detector.

4. A method for reading from a near-field optical recording medium, the method comprising:
    generating a reading light beam,
    illuminating the near-field optical recording medium with the reading light beam with a reading lens system comprising an objective lens and a solid immersion lens;
    detecting an output signal from a light beam returning from the near-field optical recording medium with a detector;
    deriving a gap error signal from the output signal of the detector; and
    deriving a data signal from the output signal of the detector;
    wherein the reading light beam is an annular light beam wherein an inner radius $r_i$ of the reading light beam is $r_i = f/n_{sil}$ and an outer radius $r_o$ of the reading light beam is $r_o = f*NA$ where f is the focal length of the reading lens system NA is the numerical aperture of the reading lens system and $n_{sil}$ is the refractive index of the solid immersion lens.

5. The method according to claim 4, wherein the deriving the data signal from the output signal of the detector comprises high-pass filtering of the output signal.

6. The method according to claim 4, wherein the deriving the gap error signal from the output signal of the detector comprises low-pass filtering of the output signal.

* * * * *